US009158223B2

(12) United States Patent
Komiya

(10) Patent No.: US 9,158,223 B2
(45) Date of Patent: Oct. 13, 2015

(54) IMAGE FORMING APPARATUS

(75) Inventor: Yoshiyuki Komiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/271,894

(22) Filed: Oct. 12, 2011

(65) Prior Publication Data

US 2012/0099123 A1 Apr. 26, 2012

(30) Foreign Application Priority Data

Oct. 20, 2010 (JP) ................................ 2010-235487

(51) Int. Cl.
*G06T 5/00* (2006.01)
*G03G 15/043* (2006.01)

(52) U.S. Cl.
CPC .................................. *G03G 15/043* (2013.01)

(58) Field of Classification Search
CPC ................................................... G03G 15/043
USPC .................................................... 358/3, 260
See application file for complete search history.

(56) References Cited

U.S. PATENT DOCUMENTS

2006/0202116 A1 9/2006 Koga et al.
2008/0100691 A1* 5/2008 Sobue .......................... 347/247
2009/0097083 A1* 4/2009 Utsunomiya ................ 358/518
2009/0135243 A1* 5/2009 Yamazaki ..................... 347/254
2009/0135343 A1* 5/2009 Kitamura et al. .............. 349/96
2010/0091351 A1 4/2010 Teramura
2011/0228364 A1* 9/2011 Miyadera et al. ............ 358/518

FOREIGN PATENT DOCUMENTS

CN 101155251 A 4/2008
CN 101576722 A 11/2009
JP 2008-292597 A 12/2008
JP 2009-090585 A 4/2009

* cited by examiner

*Primary Examiner* — Chuong A Ngo
*Assistant Examiner* — Bharatkumar Shah
(74) *Attorney, Agent, or Firm* — Canon U.S.A., Inc., IP Division

(57) ABSTRACT

In an image forming apparatus, deterioration of images is suppressed when distortions of scanning lines of a plurality of light sources are corrected. Image data is corrected each in a sub-scanning direction corresponding to the plurality of light sources, in accordance with distortion characteristics of the scanning lines of the plurality of light sources, for each of divided regions, common to a plurality of light sources, divided in a main-scanning direction, and the plurality of light sources are driven based on the image data each corrected corresponding to the plurality of light sources.

8 Claims, 12 Drawing Sheets

IMAGE FORMING APPARATUS

BACKGROUND OF THE INVENTION

1. Field of the Invention

The present invention relates to an image forming apparatus that, according to image data, scans a photosensitive member with a light beam to form a latent image on the photosensitive member, develops the latent image on the photosensitive member, and transfers the developed image onto an image bearing member.

2. Description of the Related Art

Recent electrophotographic image forming apparatuses each form a latent image on a photosensitive member with a laser beam emitted according to image data, develop the latent image on the photosensitive member with toner, and then transfer the toner image on the photosensitive member to a recording sheet. Various factors such as an assembly error of an optical system that is provided on an optical path of the laser beam, cause a scanning line of the laser beam irradiated on the photosensitive member to be distorted, for example, to be curved or tilted.

For correcting distortion of a scanning line, Japanese Patent Application Laid-Open No. 2005-304011 discusses a method for correcting image data based on distortion characteristic of the scanning line of the laser beam, and emitting the laser beam according to the image data after correction. In this distortion correction, the main-scanning line is divided into a plurality of regions. Then, the image data in respective regions is shifted in a sub-scanning direction line by line, so that the scanning line of the laser beam corresponding to the image data after correction coincides with the reference line.

Further, in recent years, image forming apparatuses each provided with a plurality of laser light sources have been discussed. In the image forming apparatuses, the plurality of laser light sources can simultaneously form a plurality of scanning lines on the photosensitive member, and to shorten time taken until an image formation is completed (see Japanese Patent Application Laid-Open No. 2003-312041).

If the distortion correction of the scanning line of the laser beam is applied to the image forming apparatus provided with the plurality of laser light sources, the following problems arise. Generally, since positions at which the laser beams from the plurality of laser light sources pass through an optical member are different from one another, distortion characteristics of the scanning lines of the plurality of laser light sources are not the same to one another.

Supposing that divided regions may be individually defined for respective scanning lines, in accordance with the distortion characteristic of each of the scanning lines of the plurality of laser light sources, and image data of the respective divided regions may be shifted line by line in the sub-scanning direction. In such a case, a region where an image is partially missing (between a(1) and b(1) in FIG. 8B) or a region where an image becomes partially thick (between a(2) and b(2) in FIG. 8B) is generated, and image quality is deteriorated.

SUMMARY OF THE INVENTION

According to an aspect of the present invention, an image forming apparatus includes an image forming unit configured to form, by scanning lines of a plurality of lights in a main-scanning direction emitted from a plurality of light sources according to image data, a latent image on a photosensitive member that rotates in a sub-scanning direction, develop the latent image on the photosensitive member, and transfer the image developed on the photosensitive member onto an image bearing member, a correction unit configured to correct, each in the sub-scanning direction corresponding to the plurality of light sources, the image data in accordance with distortion characteristics of the scanning lines of the plurality of light sources, and a driving unit configured to drive the plurality of light sources based on the image data each corrected corresponding to the plurality of light sources by the correction unit. The correction unit corrects the image data for each of divided regions divided in the main-scanning direction common to the plurality of light sources, even if distortion characteristics of the scanning lines of the plurality of light sources are different from one another.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
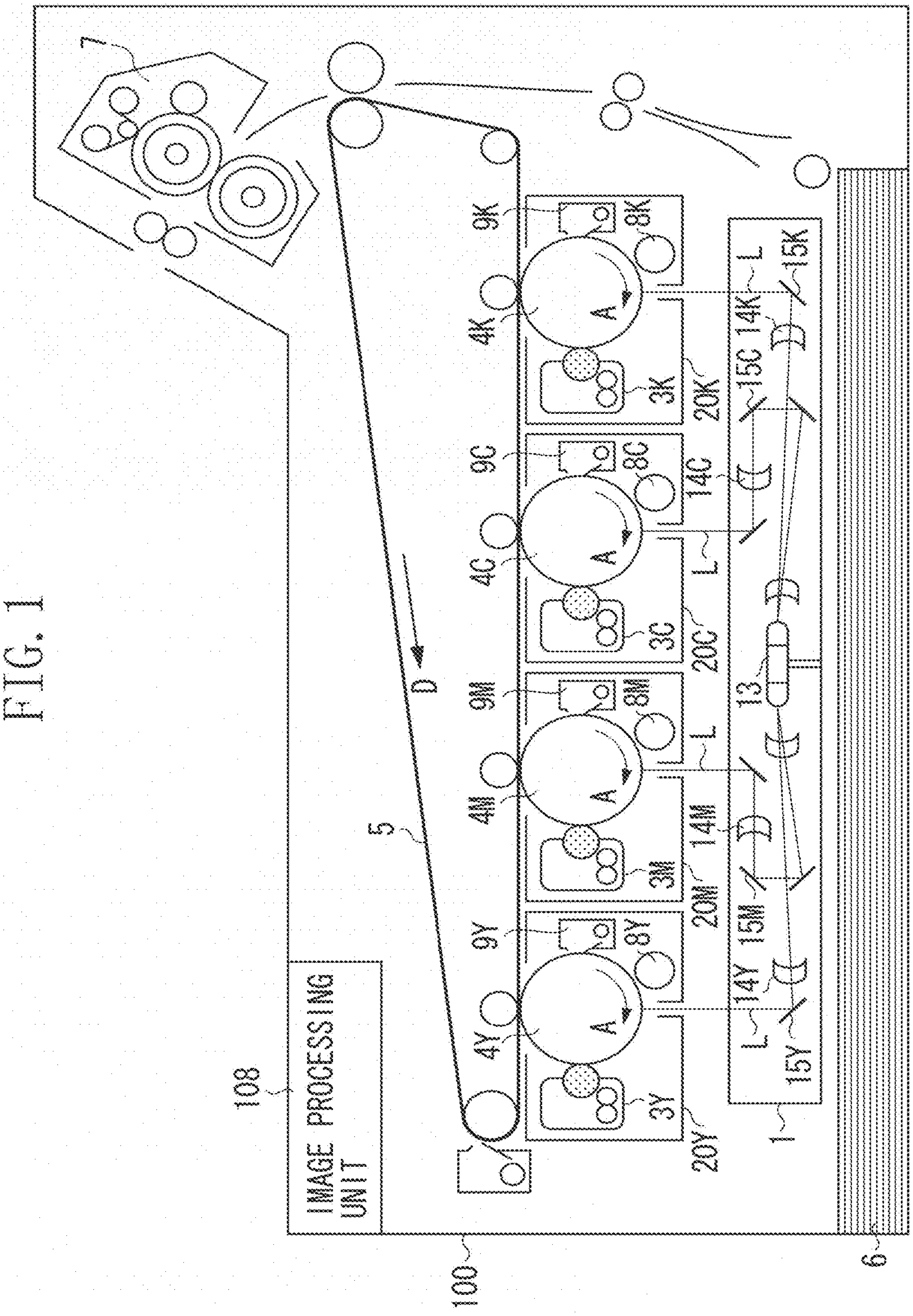
FIG. 1 is a cross-sectional view of an image forming apparatus.

FIG. 1 is a cross-sectional view of an image forming apparatus 100 according to an exemplary embodiment of the present invention. The image forming apparatus 100 includes process cartridges 20Y (yellow), 20M (magenta), 20C (cyan), and 20K (black) each including, for example, a charging device 8, a developing device 3, a photosensitive member 4, and a cleaner 9.

The charging devices 8Y, 8M, 8C, and 8K in the respective process cartridges 20Y through 20K uniformly charge the surfaces of the respective photosensitive members 4Y, 4M, 4C, and 4K. Laser light sources 11 in laser units 1 (see FIG. 2) emit laser beams L according to image data input from image processing units 108.

The laser beams L scan across the surfaces of the photosensitive members 4Y through 4K through polygonal mirrors 13, lenses 14, and mirrors 15, which are disposed in the respective laser units 1, to form latent images on the photosensitive members 4Y through 4K. The photosensitive members 4Y through 4K rotate in the direction of arrow "A".

The developing devices 3Y through 3K in the respective process cartridges 20Y through 20K develop the latent images formed on the photosensitive member 4Y through 4K with toners of respective color components.

Here, an image formation process performed by the process cartridge 20Y will be described in detail.

The surface of the photosensitive member 4Y is uniformly charged by the charging device 8Y. Next, the laser unit 1 emits the laser beam L according to image data of yellow. The laser beam L scans across the surface of the photosensitive member 4Y, to form a yellow electrostatic latent image on the photosensitive member 4Y.

The electrostatic latent image formed on the photosensitive member 4Y is developed by the yellow developing device 3Y containing yellow toner. Then, a toner image on the photosensitive member 4Y is subjected to a primary transfer onto an intermediate transfer member 5, which is rotated and driven in the direction of an arrow "D", at a nip portion between the photosensitive member 4Y and the intermediate transfer member 5.

Residual toner on the photosensitive member 4Y that is not transferred to the intermediate transfer member 5 during the primary transfer is scraped off by a cleaning blade of the cleaner 9Y press-contacted with the photosensitive member 4Y, and is recovered by a waste toner container.

In the other process cartridges 20M, 20C, and 20K, similar process to that described above are carried out. After toner images of the respective color components formed on the respective photosensitive members 4 are sequentially superimposed one over another and transferred onto the intermediate transfer members 5, the toner images of the plurality of colors on the intermediate transfer members 5 are subjected to secondary transfer onto a recording sheet 6 fed from a sheet feeding unit. The recording sheet 6 having the toner images of the plurality of colors secondarily transferred thereto is subjected to fixing operation with a fixing device 7, and discharged.

In the present exemplary embodiment, an image is transferred onto the recording sheet via the intermediate transfer member 5 as the image bearing member. Alternatively, a configuration for transferring the image onto the recording sheet as the image bearing member directly from the respective photosensitive members 4 may be used.

Figure 2:
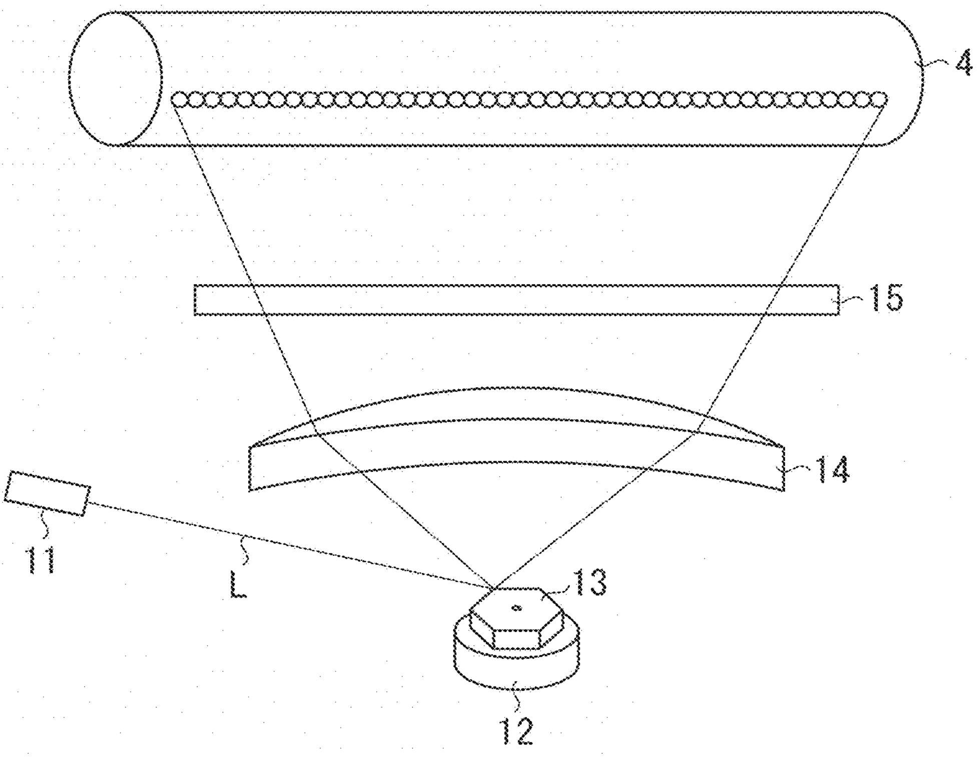
FIG. 2 illustrates a schematic configuration of a laser unit and an ideal scanning line.

FIG. 2 is a schematic view illustrating a configuration for scanning the photosensitive member with the laser beam L emitted from the laser light source 11.

The laser beam L emitted from the laser light source 11 according to the image data, is deflected by a polygonal mirror (rotatable multi-faced mirror) 13 rotated by a polygonal mirror motor 12. The laser beam L deflected by the polygonal mirror 13 passes through an f-θ lens 14, which has a characteristic of maintaining a linear scanning speed of the laser beam L on the surface of the photosensitive member 4 to be constant, and enters into a reflection mirror 15.

The laser beam L reflected by the reflection mirror 15 scans the rotating photosensitive member 4. In the present exemplary embodiment, a direction in which scanning is performed with the laser beam L is defined as a main-scanning direction, and a direction in which the photosensitive member 4 rotates is defined as a sub-scanning direction. The sub-scanning direction intersects the main-scanning direction at right angle.

Each of the laser light sources 11 for respective colors of Y, M, C, K in the laser units 1 according to the present exemplary embodiment includes two laser light sources 11*a* and 11*b* which irradiate different positions in a rotational direction of the photosensitive member 4 with the laser beams, for simultaneously forming two scanning lines on the same photosensitive member 4.

Figure 3:
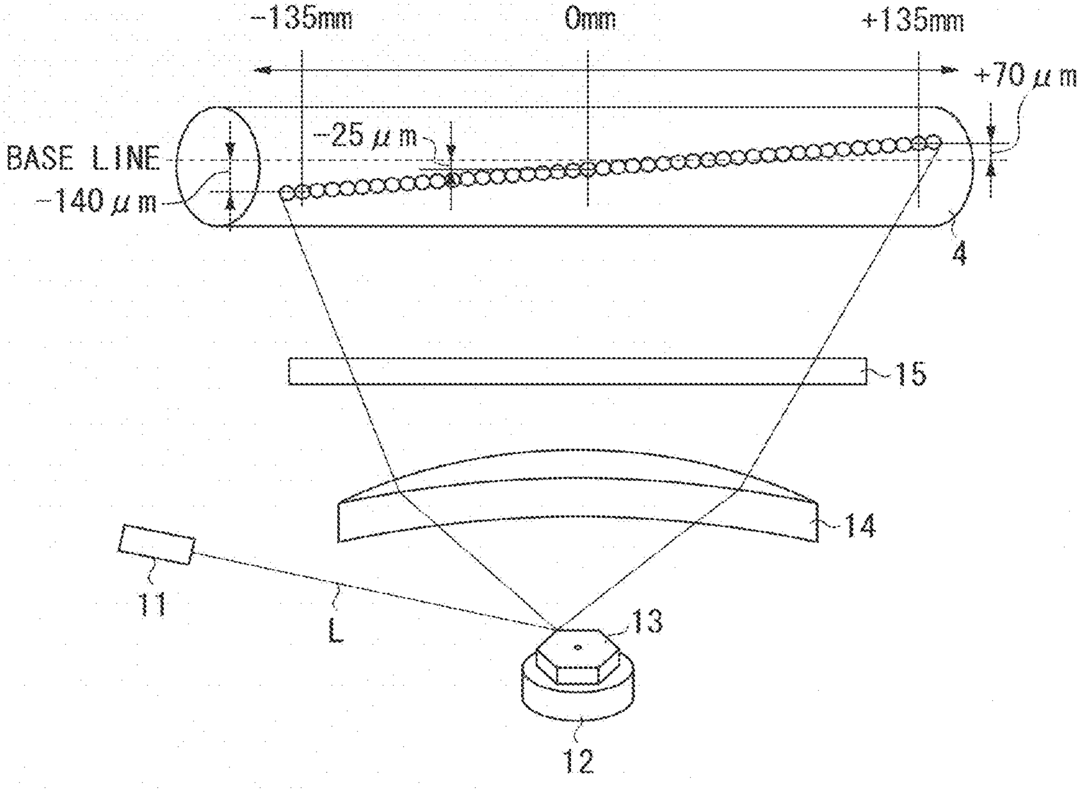
FIG. 3 illustrates a schematic configuration of the laser unit and a distorted scanning line.

Although, ideally, a scanning line formed on the photosensitive member 4 is horizontal, as illustrated in FIG. 2A, the scanning line is actually distorted, for example, curved or tilted, as illustrated in FIG. 3.

The distortion of the scanning line is unique for each device, and has individual difference. As measures against the distortion of the scanning line, an expensive optical component may be used or an optical component may be precisely and finely adjusted. However, costs, such as component costs and manpower costs, are increased in either case.

In the present exemplary embodiment, the distortion of a scanning line is dealt with at a low cost by the following measures. The image processing unit 108 performs digital correction of image data so that the distortion of the scanning line is corrected in accordance with the distortion characteristics of the scanning line of the laser beam, and the laser unit 1 emits the laser beam in accordance with the corrected image data.

More specifically, a main-scanning line that is curved or tilted is divided into a plurality of regions, and image data of each region is shifted line by line of the image data in a sub-scanning direction so that the main-scanning line comes closer to a reference line when the photosensitive member is scanned therewith, to correct the distortion. With this operation, the distortion of the scanning line is corrected.

Figure 4:
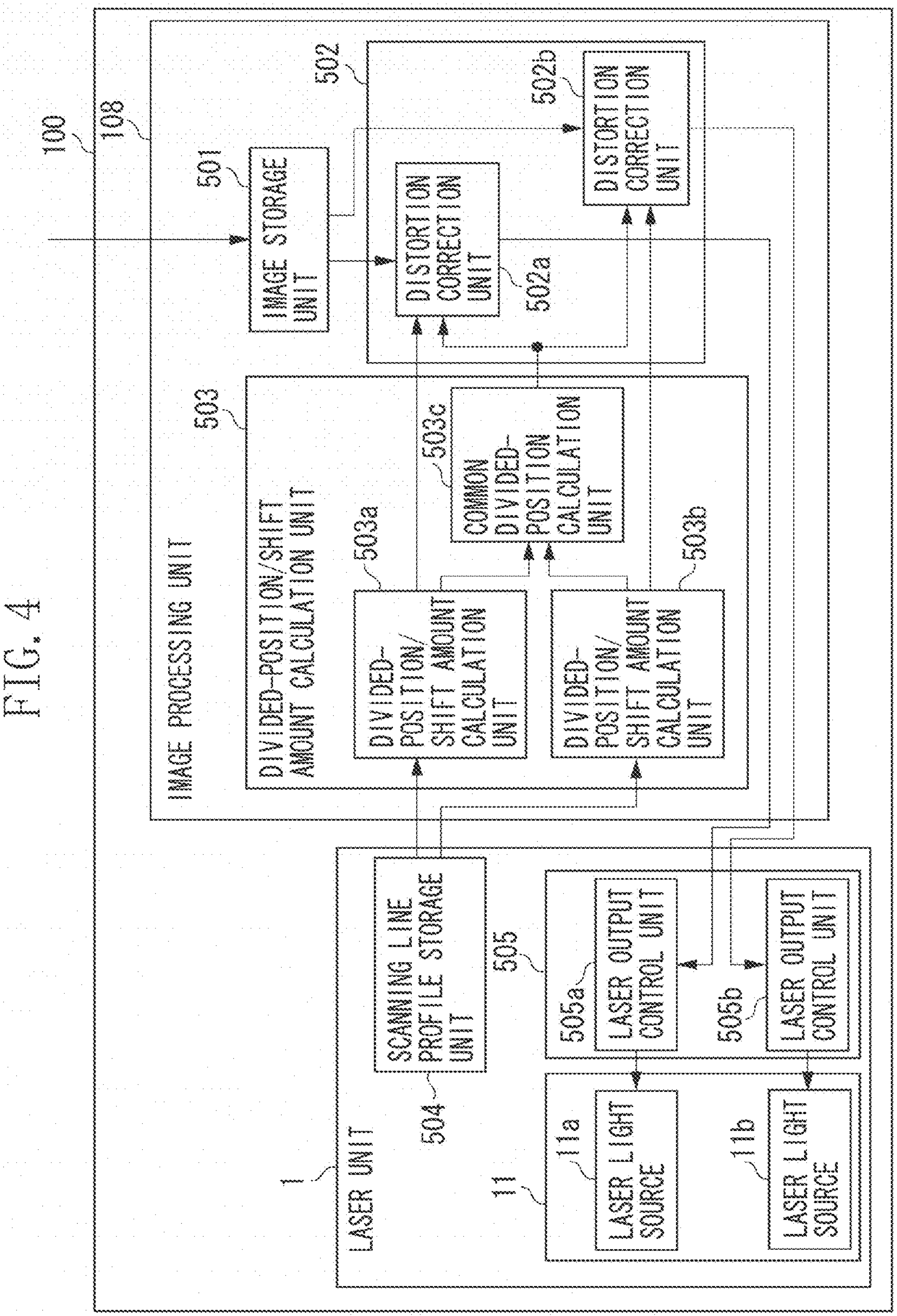
FIG. 4 is a block diagram illustrating an image processing unit that corrects distortion of a scanning line.

FIG. 4 is a block diagram illustrating the image processing unit 108 that corrects the distortion of the scanning line, corresponding to the laser light source with respect to one color component. The image processing unit 108 illustrated in FIG. 1 includes an image processing unit illustrated in FIG. 4 for each of Y, M, C, and K.

The laser unit 1 includes a laser light source 11 and a laser output control unit 505 that controls the laser light source 11 in accordance with input image data. Four of the laser light sources 11 and the laser output control units 505 are provided corresponding to the photosensitive members 4Y through 4K. The laser unit 1 also includes a profile storage unit 504 that stores a scanning-line profile that indicates the distortion characteristics of the scanning lines corresponding to the respective laser light sources.

The image forming apparatus illustrated in FIG. 1 includes two laser light sources 11*a* and 11*b* for each of the photosensitive members 4Y through 4K. The scanning line profile is stored in the scanning line profile storage unit in correspondence with each of eight laser light sources (4(Y, M, C, K)×2(11*a*, 11*b*)).

Figure 5A:
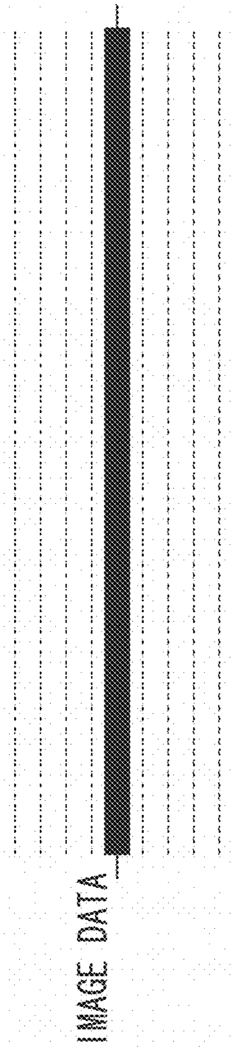
FIGS. 5A and 5B illustrate a distortion of a scanning line.
Figure 5B:
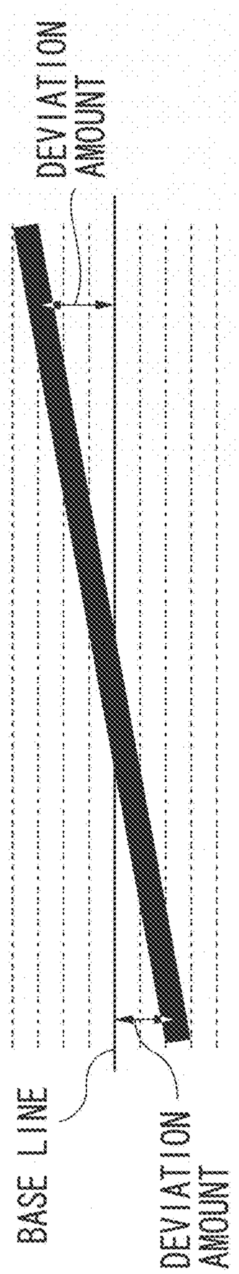

The scanning line profile is data indicating distortion characteristics of a scanning line in FIG. 5B when the laser beam is emitted according to image data indicating a horizontal straight line illustrated in FIG. 5A. The data representing the distortion characteristic indicates deviation amounts in the sub-scanning direction from the reference line at each position of a plurality of main-scanning positions.

The image processing unit 108 includes an image storage unit 501 that temporarily stores input image data, a distortion correction unit 502 that shifts the image data stored in the image storage unit 501 in the sub-scanning direction based on the scanning line profile, and a divided-position/shift amount calculation unit 503.

The divided-position/shift amount calculation unit 503 calculates divided positions in the main-scanning direction and shift amounts line by line in the sub-scanning direction based on the scanning line profile stored in the profile storage unit 504, and supplies the divided positions and the shift amounts to the distortion correction unit 502.

Figure 6A:
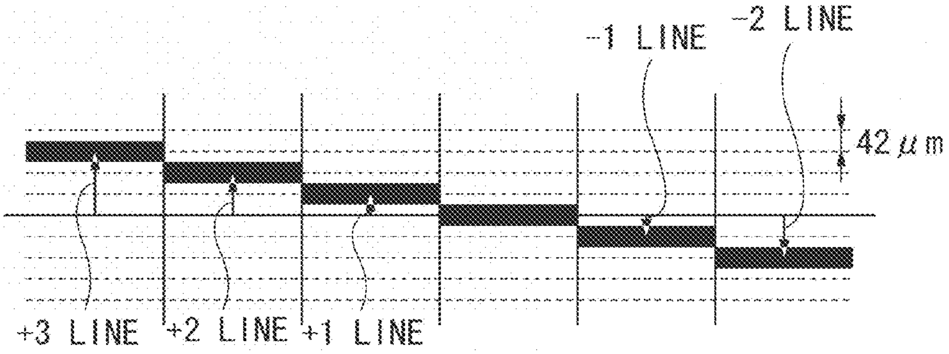
FIGS. 6A and 6B illustrate a correction of a distortion of a scanning line.

Based on the divided positions in the main-scanning direction and the shift amounts line by line in the sub-scanning direction, the distortion correction unit 502 shifts the image data illustrated in FIG. 5A in the sub-scanning direction for each region, as illustrated in FIG. 6A. The distortion correction unit 502 outputs image data subjected to shift processing to the laser output control unit 505.

The laser output control unit 505 controls the laser light source 11, based on the image data which have been subjected to shift processing. The laser beam emitted from the laser light source 11 based on the image data which have been subjected to shift processing illustrated in FIG. 6A scans the photosensitive member, as illustrated in FIG. 6B.

Figure 6B:
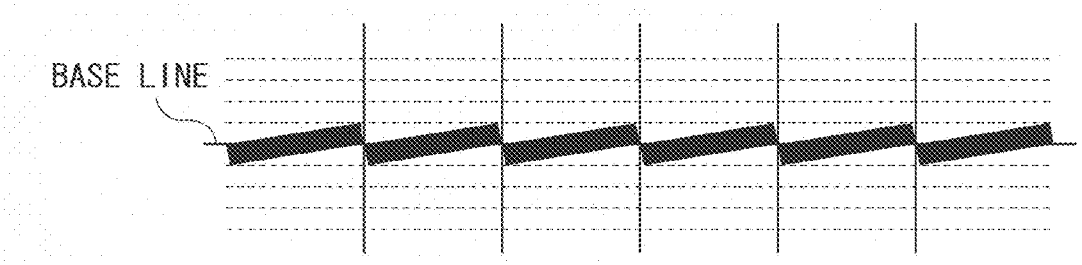

The scanning line illustrated in FIG. 6B is formed so that the deviation amount in the sub-scanning direction with respect to the reference line is less than one line, and the scanning line illustrated in FIG. 6B coincides with the reference line when compared with the scanning line illustrated in FIG. 5B.

In the scanning line profile, there are stored deviation amounts in the sub-scanning direction of the scanning line from the reference line in the sub-scanning direction at each position of the plurality of main-scanning positions. In the case of the scanning line illustrated in FIG. 3, the main-scanning position is deviated by −140 μm in the sub-scanning direction from the reference line at a position −135 mm from the center, the main-scanning position is deviated by −25 μm in the sub-scanning direction from the reference line at a position (0 mm) of the center, and the main-scanning position is deviated by +70 μm in the sub-scanning direction from the reference line at a position +135 mm from the center.

The deviation amounts at the positions of −135 mm, 0 mm, +135 mm in the main-scanning direction are measured with a dedicated jig, and −140 μm, −25 μm, +70 μm are written as deviation amount data of the scanning line profile corresponding to the laser light source corresponding to the scanning line into the profile storage unit 504.

The divided-position/shift amount calculation unit 503 reads out the scanning line profile corresponding to the laser light source from the profile storage unit 504, and calculates deviation amounts of all of the main-scanning positions using a quadratic function based on deviation amounts at three points in the main-scanning direction. However, it is not limited to the quadratic function, but also a linear function or a multiple-order function having an order higher than two such as a cubic function may be used, depending on curving or tilting of the scanning line.

Further, deviation amounts stored in the scanning line profile are not limited to the ones measured at three points, but also the ones measured at two points or more can be used. Instead of calculating, from deviation amounts at the plurality of positions in the main-scanning direction, deviation amounts at positions other than the plurality of positions, deviation amounts at all positions in the main-scanning direction may be stored in the scanning line profile.

In the present exemplary embodiment, since two laser light sources 11*a* and 11*b* are provided for one color component, distortions of the scanning line produced by each of the laser light sources are corrected, based on each of the scanning line profiles.

In other words, the divided-position/shift amount calculation unit 503*a* and the distortion correction unit 502*a* perform processing corresponding to the laser light source 11*a*, and the divided-position/shift amount calculation unit 503*b* and the distortion correction unit 502*b* perform processing corresponding to the laser light source 11*b*.

Figure 7A:
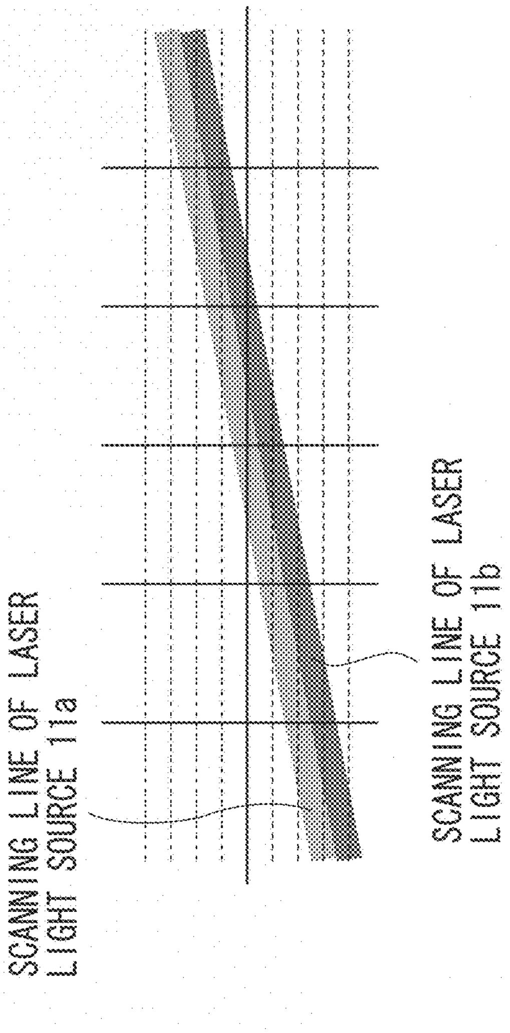
FIGS. 7A and 7B illustrate distortions of two scanning lines and corrections.
Figure 7B:
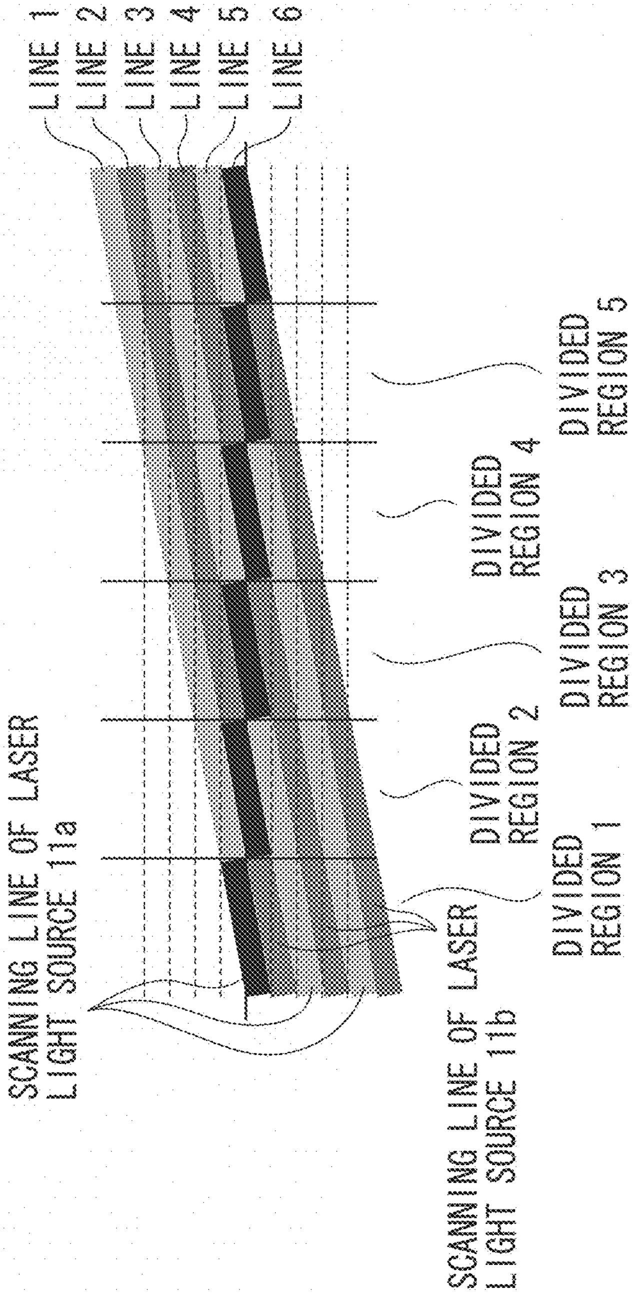

First, distortion correction in a case where curving and tilting of the scanning lines by the two laser light sources are identical to one another will be described. In a case where the scanning lines of the laser light sources 11*a* and 11*b* have tilts illustrated in FIG. 7A, divided positions and shift amounts corresponding to the laser light sources 11*a* and 11*b* become identical to one another.

Therefore, a latent image based on the image data representing one horizontal line, by the distortion correction, is formed by alternately using the laser light source 11*a* and the laser light source 11*b* for each divided region.

More specifically, a divided region 1 is formed when the laser light source 11*a* scans a line 1, a divided region 2 is formed when the laser light source 11*b* scans a line 2, a divided region 3 is formed when the laser light source 11*a* scans a line 3, a divided region 4 is formed when the laser light source 11*b* scans a line 4, a divided region 5 is formed when the laser light source 11*a* scans a line 5, and a divided region 6 is formed when the laser light source 11*b* scans a line 6.

Here, since the profiles of the scanning lines of the two laser light sources are identical to each other, divided positions of the scanning lines of the laser light source 11*a* and divided positions of the scanning lines of the laser light source 11*b* are identical to each other. Therefore, the divided regions scanned by the laser light source 11*a* and divided region scanned by the laser light source 11*b* are continuous.

Generally, the positions at which two laser beams from two laser light sources pass through an optical member are different from each other, the profiles of the scanning lines of the two laser light sources are not identical to each other (i.e., distortion characteristics of the scanning lines of the two laser light sources are different from each other). Here, problems in the distortion correction in a case where distortion characteristics of the scanning lines by the two laser light sources are different from each other will be described.

Figure 8A:
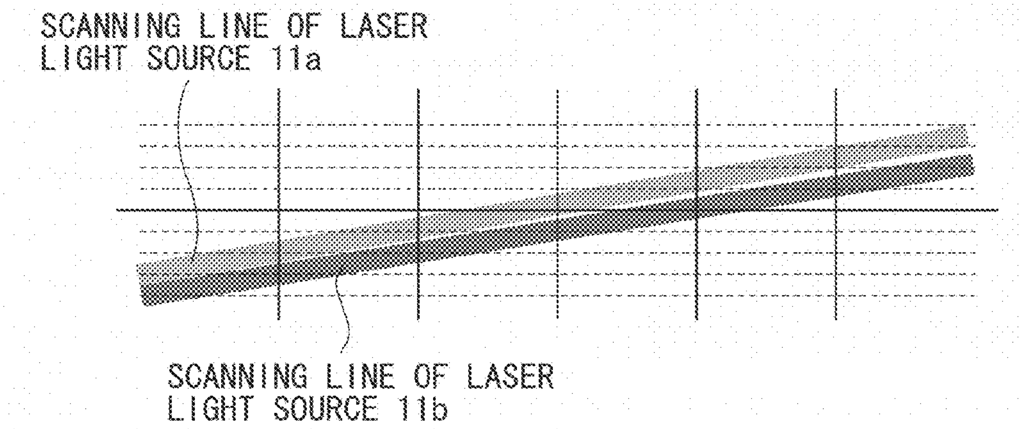
FIGS. 8A and 8B illustrate distortions of two scanning lines and corrections of comparison example.
Figure 8B:
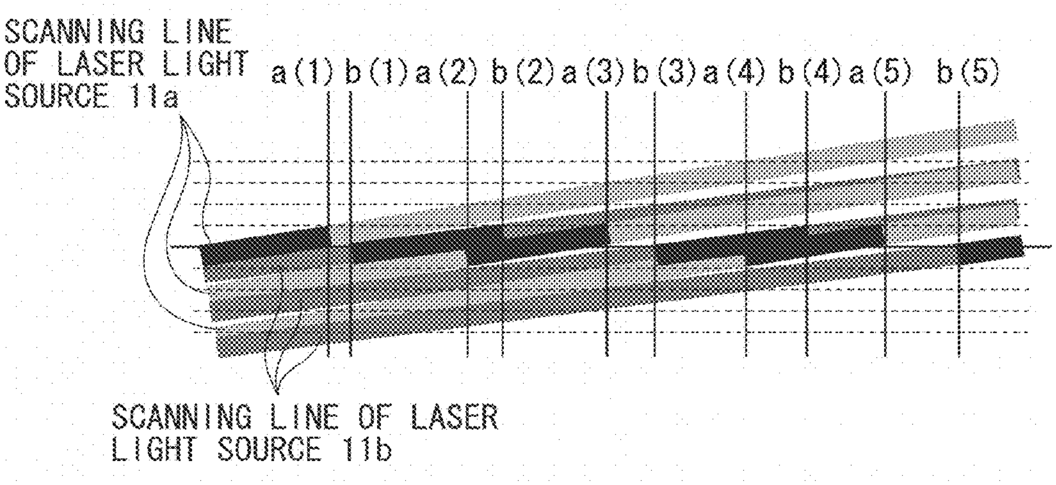

In a case where divided positions and shift amounts are determined independently with respect to the laser light sources 11*a* and 11*b* having different tilting as illustrated in FIG. 8A, divided positions a(1) through a(5) of the laser light source 11*a* and divided positions b(1) through b(5) of the laser light source 11*b* are determined respectively, as illustrated in FIG. 8B.

Then, processing of shifting image data of the divided regions line by line in the sub-scanning direction is performed for each of the laser light source 11*a* and the laser light source 11*b*, and is alternately converted into laser light beams by the laser light source 11*a* and the laser light source 11*b*.

However, because the divided positions of the scanning lines of the two laser light sources are different from each other, a region may be generated where an image is partially missing (between a(1) and b(1) in FIG. 8B) since the laser beam is not irradiated, or a region where an image become partially thick (between a(2) and b(2) in FIG. 8B) since the laser beams are irradiated in a superposed manner.

In FIG. 8B, the main-scanning regions which are not irradiated with the laser beams are between a(1) and b(1), between a(3) and b(3), and between a(5) and b(5), and the main-scanning regions which are irradiated in a superimposed manner with the laser beams are between a(2) and b(2), and between a(4) and b(4).

For example, a region from a starting point of the horizontal line of interest to a(1) is formed by the laser light source 11*a*. On the other hand, the laser light source 11*b* forms a horizontal line different from the horizontal line of interest in a region from a starting point to b(1). Then, a region from b(1)

to b(2) of the horizontal line of interest is formed by the laser light source 11*b*. That is, a region from a(1) to b(1) of the horizontal line of interest will not be formed by any of the laser light source 11*a* and the laser light source 11*b*.

Figure 9A:
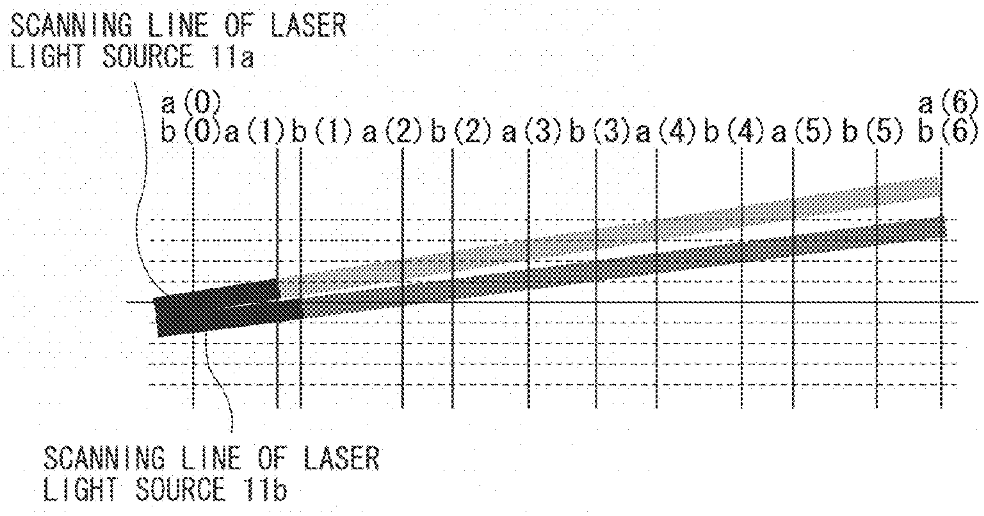
FIGS. 9A to 9C illustrate distortions of two scanning lines and corrections according to the present exemplary embodiment.
Figure 9B:
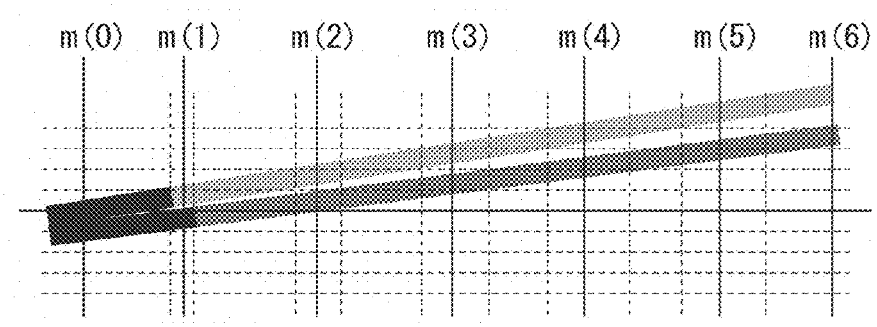
Figure 9C:
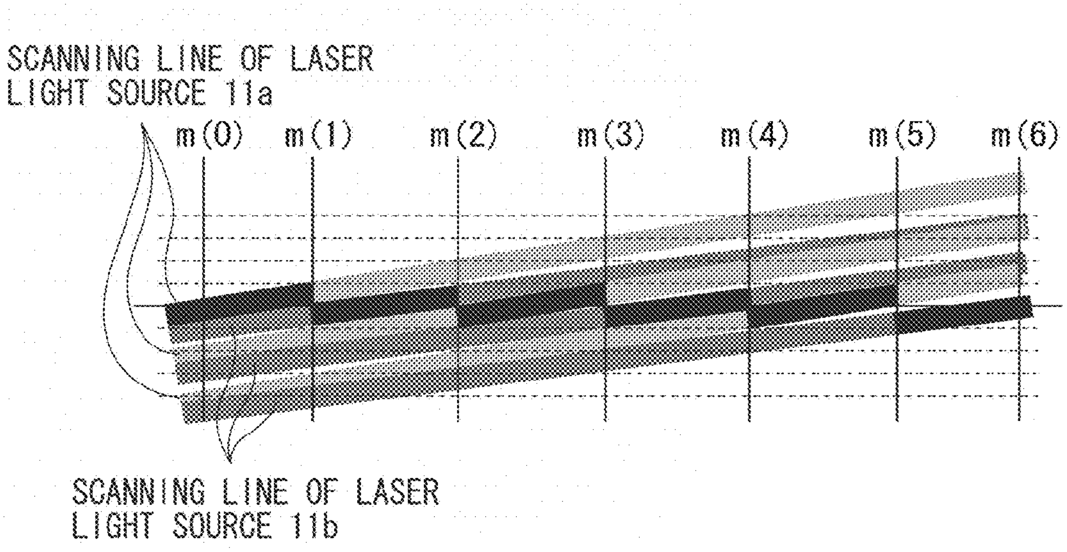

Thus, in the present exemplary embodiment, as illustrated in FIGS. 9A to 9C, divided positions m(n) common to the laser light sources 11*a* and 11*b* are determined, based on divided positions a(n) of the scanning lines of the laser light source 11*a* and divided positions b(n) of the scanning lines of the laser light source 11*b*. The image data of the divided regions is shifted in the sub-scanning direction line by line. In FIGS. 9A to 9C, "n" is an integer from 0 to 6. It will be described in detail with reference to FIG. 4.

The divided-position/shift amount calculation unit 503*a* calculates divided positions a(n) in the main-scanning direction and shift amounts line by line in the sub-scanning direction in the respective divided regions, based on the scanning line profile of the laser light source 11*a* stored in the profile storage unit 504, so that errors in the sub-scanning direction between the reference line and the scanning lines fall within ±1 line.

Similarly, the divided-position/shift amount calculation unit 503*b* calculates divided positions b(n) in the main-scanning direction and shift amounts line by line in the sub-scanning direction in respective divided regions, based on the scanning line profile of the laser light source 11*b* stored in the profile storage unit 504.

The divided-position/shift amount calculation units 503*a* and 503*b* output divided positions a(n) and b(n) in the main-scanning direction to a common divided-position calculation unit 503*c*. The common divided-position calculation unit 503*c* calculates common divided-positions m(n) for each "n", based on the divided positions a(n) and b(n) in the main-scanning direction.

For example, the common divided-position calculation unit 503*c* determines average values of divided positions a(n) and b(n) based on m(n)=(a(n)+b(n))/2 as common divided-positions m(n). The common divided-position calculation unit 503*c* outputs the common divided-positions m(n) to the distortion correction units 502*a* and 502*b*.

The divided-position/shift amount calculation unit 503*a* outputs shift amounts in the sub-scanning direction in respective divided regions to the distortion correction unit 502*a*. The divided-position/shift amount calculation unit 503*b* outputs shift amounts in the sub-scanning direction in respective divided regions to the distortion correction unit 502*b*.

The distortion correction unit 502*a* reads out image data from the image storage unit 501, and shifts the image data for each of the respective divided regions indicated by the common divided-positions m (n) in the sub-scanning direction by shift amounts corresponding to the respective divided regions. Then, in a case where the scanning profiles of the laser light sources indicate distortion characteristics illustrated in FIG. 9A to 9C, the distortion correction unit 502*a* outputs only image data of the divided regions in odd numbers (between starting position and divided position m(1), between divided position m(2) and divided position m(3), between divided position m(4) and divided position m(5)) to the laser output control unit 505*a*.

The distortion correction unit 502*b* reads out image data from the image storage unit 501, and shifts the image data for each of the respective divided regions indicated by the common divided-positions m (n) in the sub-scanning direction by shift amounts corresponding to the respective divided regions.

Then, in a case where the scanning profiles of the laser light sources indicate distortion characteristics illustrated in FIGS. 9A to 9C, the distortion correction unit 502*b* outputs only image data of the divided regions in even numbers (between divided position m(1) and divided position m(2), between divided position m(3) and divided position m(4), between divided position m(5) and end position) to the laser output control unit 505*b*.

Figure 10:
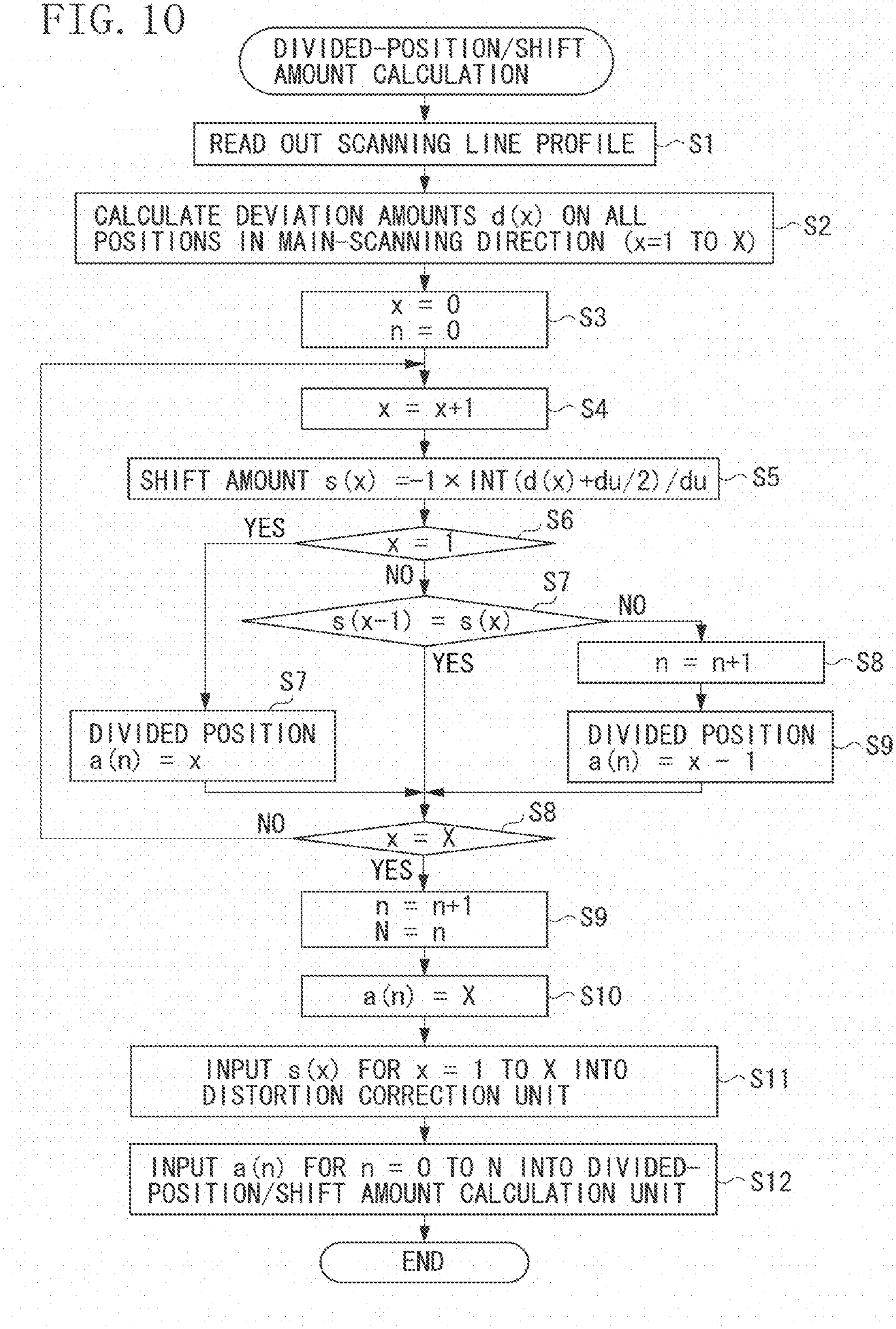
FIG. 10 is a flowchart illustrating processing performed by a divided-position/shift amount calculation unit.

FIG. 10 is a flowchart illustrating the processing performed by the divided-position/sift amount calculation unit 503*a*.

First, in step S1, the calculation unit 503*a* reads out profile information of the laser light source 11*a* from the profile storage unit 504. Then, in step S2, the calculation unit 503*a* generates quadratic function based on the profile information, and calculates deviation amounts d(x) in the sub-scanning direction from the reference line on all positions in the main-scanning direction (x=1 to X), using the generated quadratic function.

In this case, x=0 corresponds to a position of −135 mm from a position of the center of the main-scanning direction, and x=X corresponds to a position of +135 mm from the position of the center of the main-scanning direction.

Next, in step S3, the calculation unit 503*a* substitutes 0 into a variable "x" and a variable "n". Then, in step S4, the calculation unit 503*a* increments the variable "x" by 1. Then, in step S5, the calculation unit 503*a* calculates shift amount s(x)=−1×INT((d(x)+du/2)/du). Herein, INT function is a function for rounding a positive or negative numerical value down to the nearest integer smaller than that. Further, du is a 1 line width, which is 42 μm in the present exemplary embodiment.

Next, if the variable "x" is 1 (YES in step S6), then in step S7, the calculation unit 503*a* substitutes x into divided position a(n). Then, if the variable "x" is not "X" (NO in step S8), the processing returns to step S4, and the calculation unit 503*a* calculates shift amount s(x) of the next position.

If the variable "x" is other than 1 in step S6 and s(x−1)=s(x) (YES in step S7), the processing proceeds to step S8. If s(x−1)≠s(x) in step S7 (NO in step S7), then in step S8, the calculation unit 503*a* increments the variable "n" by 1. In step S9, the calculation unit 503*a* sets x−1 as the divided position a(n), and the processing proceeds to step S8.

If the variable "x" is "X" (YES in step S8), then in step S9, the calculation unit 503*a* increments the variable "n" by 1, and sets the variable "N" to "n". Then, in step S10, the calculation unit 503*a* sets "X" as the divided position a(n).

Finally, in step S11, the calculation unit 503*a* inputs shift amounts s(x) for x=1 to "X" into the distortion correction unit 502*a*. Then in step S12, the calculation unit 503*a* inputs the divided positions a(n) for n=0 to "N" into the common divided-position calculation unit 503*c*.

The divided-position/shift amount calculation unit 503*b* also performs processing similar to the above-described processing. The common divided-position calculation unit 503*c* determines divided positions m(n)=(a(n)+b(n)/2))/2 for n=0 to "N", and inputs the divided positions m(n) into the distortion correction units 502*a* and 502*b*.

The distortion correction unit 502*a* shifts image data of divided regions of divided positions m(n+1) from the divided positions m(n) for n=0 to N−1, in the sub-scanning direction by shift amounts ((m(n)+m (n+1))/2).

As described above, according to the present exemplary embodiment, divided positions common to the two laser light sources are determined, and image data of the divided regions is shifted in the sub-scanning direction line by line. As a result, an image will never be partially missing or become thick, even if distortion corrections of the two laser light sources are corrected according to the respective profiles.

In particular, since the divided positions common to the two laser light sources are determined to be average positions of the divided positions determined from distortion characteristics of each of the laser light sources, divided positions, at which shift processing suitable for both the laser light sources is possible, can be attained.

For example, in a case where divided positions determined from the distortion characteristics of the one laser light source are determined to be divided positions of the other laser light source, errors of the scanning lines of the other laser light source with respect to the reference line may become large. In the present exemplary embodiment, however, errors of the scanning lines of the one laser light source with respect to the reference line will not become large.

In the above-described exemplary embodiment, the divided positions of each of the two laser light sources have been determined from the distortion characteristics. However, even in a case where the divided positions of each of the two laser light sources are fixed, the effects of the present invention can be obtained by employing the divided positions common to the two laser light sources.

Further, in the above-described exemplary embodiment, an image forming apparatus including the two laser light sources can be applied to an image forming apparatus including three or more laser light sources.

Further, in the above-described exemplary embodiment, by the common divided-position calculation unit 503*c* included in the image processing unit 108, the common divided-positions have been calculated from the divided positions corresponding to the laser light sources 11*a* and 11*b*. Alternatively, the common divided-positions may be calculated in advance from the divided positions corresponding to the laser light sources 11*a* and 11*b*, and stored in the scanning line profile storage unit 504 corresponding to respective colors.

The scanning line profiles corresponding to respective colors store therein common divided-positions and shift amounts corresponding to each of the laser light sources.

Further, in the above-described exemplary embodiment, a configuration in which the image processing unit 108 is arranged inside the image forming apparatus 100 has been employed, however, it is not limited to this. Alternatively, a program for executing the functions of the image processing unit 108 is loaded into a personal computer, and thereby the personal computer may execute the functions of the image processing unit 108.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-235487 filed Oct. 20, 2010, which is hereby incorporated by reference herein in its entirety.

What is claimed is:

1. An image forming apparatus comprising:

a photosensitive member configured to rotate in a sub-scanning direction;

first and second light sources configured to emit first and second light beams with which different positions on the photosensitive member in the sub-scanning direction are irradiated and with which the photosensitive member is scanned in a main scanning direction intersecting the sub-scanning direction;

a developing device configured to develop a latent image formed on the photosensitive member with the first and second light beams;

a transfer member configured to transfer the image developed on the photosensitive member onto a recording medium;

a shift unit configured to shift image data in the sub-scanning direction so that the deviation in sub-scanning direction is corrected with respect to one line generated by the first or the second light source; and a driving unit configured to drive the first and second light sources based on the image data corrected corresponding to the first and second light sources by the shift unit, wherein the shift unit is configured to shift image data corresponding to the first light source in the sub-scanning direction based on a divided-position common to the first and second light sources in the main-scanning direction and a first shift amount corresponding to a distortion characteristic of the first light source, a plurality of pieces of image data is included between two of the adjacent divided positions and the shift unit shifts the image data with respect to the plurality of pieces of image data by using same shift amounts which correspond to the two of the divided positions, and wherein the shift unit is configured to shift image data corresponding to the second light source in the sub-scanning direction based on the divided-position and a second shift amount corresponding to a distortion characteristic of the second light source, a plurality of pieces of image data are included between two of the adjacent divided positions and the shift unit shifts the image data with respect to the plurality of pieces of image data by using same shift amounts which correspond to the two of the divided positions.

2. The image forming apparatus according to claim 1, wherein the shift unit determines divided positions corresponding to each of the first and second light sources in accordance with distortion characteristics of scanning lines of the first and second light sources, and determines the divided position common to the first and second light sources from the divided positions corresponding to each of the first and second light sources.

3. The image forming apparatus according to claim 2, wherein the shift unit sets averages of divided positions corresponding to each of the first and second light sources as the divided position common to the first and second light sources.

4. The image forming apparatus according to claim 1, further comprising:

a storage unit configured to store first and second distortion characteristics of scanning lines of the first and second light sources, wherein the shift unit shifts the image data in accordance with the first and second distortion characteristics.

5. The image forming apparatus according to claim 1, wherein the shift unit shifts the image data line by line of the image data in the sub-scanning direction.

6. The image forming apparatus according to claim 1, wherein the distortion characteristics are characteristics of distortions of scanning lines of the first and second light sources with respect to a reference line, and wherein the shift unit shifts the image data so that deviation amounts in the sub-scanning direction of the scanning lines with respect to the reference line become less than one line of the image data.

7. The image forming apparatus according to claim 6, wherein each of distortion characteristics of the scanning lines of the first and second light sources is represented by deviation amounts in the sub-scanning direction with respect to the reference line of a plurality of positions in the main-scanning direction of the scanning lines, and wherein the shift unit determines deviation amounts in the sub-scanning direction with respect to the reference line of positions other than the plurality of positions by using a linear function or multiple-order function based on deviation amounts with respect to the reference line of the plurality of positions.

8. The image forming apparatus according to claim 1, wherein the transfer member is an intermediate transfer member onto which the image developed on the photosensitive member is transferred, and which transfers the transferred image onto a recording medium.

* * * * *